(12) United States Patent
Masumoto (10) Patent No.: US 10,740,879 B2
(45) Date of Patent: Aug. 11, 2020

(54) IMAGE PROCESSING APPARATUS, IMAGE READING APPARATUS, AND IMAGE FORMING APPARATUS

(71) Applicant: KONICA MINOLTA, INC., Chiyoda-ku, Tokyo (JP)

(72) Inventor: Kosuke Masumoto, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/244,584

(22) Filed: Jan. 10, 2019

(65) Prior Publication Data

US 2019/0266707 A1 Aug. 29, 2019

(30) Foreign Application Priority Data

Feb. 26, 2018 (JP) ................................ 2018-031954

(51) Int. Cl.
| | |
|---|---|
| *G06T 5/00* | (2006.01) |
| *H04N 5/213* | (2006.01) |
| *H04N 5/357* | (2011.01) |
| *H04N 5/06* | (2006.01) |
| *H04N 5/225* | (2006.01) |
| *H04N 5/232* | (2006.01) |

(52) U.S. Cl.
CPC .............. *G06T 5/002* (2013.01); *H04N 5/06* (2013.01); *H04N 5/213* (2013.01); *H04N 5/23229* (2013.01); *H04N 5/357* (2013.01); *H04N 5/3577* (2013.01)

(58) Field of Classification Search
CPC ........ G06T 5/002; H04N 5/213; H04N 5/357; H04N 5/06
See application file for complete search history.

(56) References Cited

U.S. PATENT DOCUMENTS

2007/0018919 A1* 1/2007 Zavracky ............. G09G 3/3406
345/87
2013/0033557 A1* 2/2013 Lim ........................ B41J 2/471
347/224

FOREIGN PATENT DOCUMENTS

JP 2003312044 A 11/2003

* cited by examiner

*Primary Examiner* — Ahmed A Berhan
(74) *Attorney, Agent, or Firm* — Buchanan Ingersoll & Rooney PC (57) ABSTRACT

There are provided an image reader, a noise canceller, and an image processor. The image reader reads an image, outputs image data, and generates a horizontal synchronization signal. The noise canceller generates a noise-canceling signal to eliminate a noise entering a horizontal synchronization signal and eliminates a noise from a horizontal synchronization signal. The image processor captures effective image data out of image data transferred from the image reader correspondingly to a timing when the horizontal synchronization signal changes from a first signal level to a second signal level. The noise canceller generates a noise-canceling signal from a noise detection signal or image data generated in the image reader.

14 Claims, 9 Drawing Sheets

IMAGE PROCESSING APPARATUS, IMAGE READING APPARATUS, AND IMAGE FORMING APPARATUS

CROSS-REFERENCE TO RELATED APPLICATIONS

The entire disclosure of Japanese Patent Application No. 2018-31954, filed on Feb. 26, 2018, is incorporated herein by reference in its entirety.

BACKGROUND

Technological Field

The present invention relates to an image processing apparatus, an image reading apparatus, and an image forming apparatus.

Description of the Related Art

In an image forming apparatus including an image reading apparatus such as a scanner, the image reading apparatus allows a CCD (Charge Coupled Device) or a CIS (Contact Image Sensor) to read a document and transmits read data to an image processor. An image processing circuit in the image processor determines the beginning of a horizontal scanning direction and acquires image data during an effective image period in accordance with a horizontal synchronization signal generated from an AFE (Analog Front End) on a CCD substrate or a CIS substrate of the image reader.

A noise such as static electricity may be generated when image data acquired from the image reading apparatus is transmitted to the image processor. For example, the noise such as static electricity is generated when a user manipulates a display panel of the image forming apparatus or inserts a USB memory into a slot of the image forming apparatus. It takes approximately 175 ns until the noise converges. In some cases, the noise enters a horizontal synchronization signal line while the image reader transmits image data to the image processor. In such a case, the image processing circuit may incorrectly determine the beginning of horizontal scanning. The image processor may acquire partially missing or misaligned image data.

Patent Literature 1 discloses the configuration that detects the specified number of high states of a horizontal synchronization signal and then detects a falling state even when a noise affects the horizontal synchronization signal from a multifunction laser printer. A falling state due to the noise can be ignored even when the noise lowers the horizontal synchronization signal in the high state. It is possible to appropriately determine one cycle of horizontal scanning.

CITATION LIST

Patent Literature

Patent Literature 1: JP 2003-312044 A

SUMMARY

Figure 9:
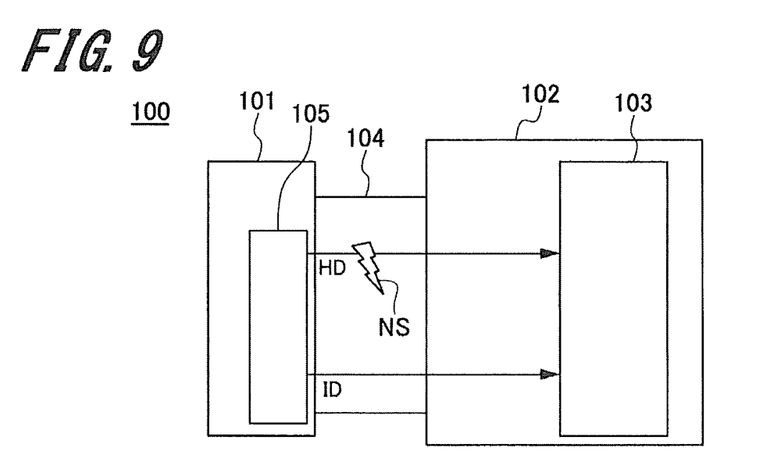
FIG. 9 is a schematic configuration diagram illustrating the image processing apparatus using an FFC to connect an image reading apparatus including a CIS substrate with a control substrate at the side of an image processing apparatus body including an image processing circuit.

A generally known technology uses a mask signal to disrupt a signal to be detected during only a specified period in order to prevent incorrect detection due to an entry of a noise into the signal to be detected. FIG. 9 is a schematic configuration diagram illustrating an image processing apparatus 100 in which an FFC (Flexible Flat Cable) 104 connects an image reading apparatus 101 mounted with a CIS substrate 105 to a control substrate at the side of an image processing apparatus body 102 mounted with an image processing circuit 103. The description below explains a case where noise NS such as static electricity enters horizontal synchronization signal HD when horizontal synchronization signal HD generated from the CIS substrate 105 is transmitted to the image processing circuit 103 at the side of the image processing apparatus body 102 via the FFC 104.

Figure 10:
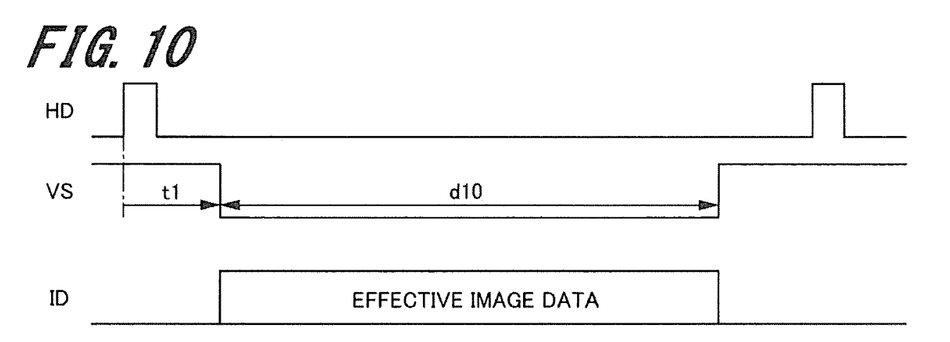
FIG. 10 is a diagram illustrating operation timing for horizontal synchronization signal HD, image capturing signal VS, and image data ID during normal operation of the image processing apparatus in FIG. 9 without noise NS.

FIG. 10 illustrates operation timing for horizontal synchronization signal HD, image capturing signal VS, and image data ID in the image processing apparatus 100 in FIG. 9 during normal operation without noise NS. Horizontal synchronization signal HD and image data ID represent signals that are generated at the side of the CIS substrate 105 in the image reading apparatus 101 and are transmitted to the image processing circuit 103 mounted on the control substrate of the image processing apparatus body 102 via the FFC 104. Image capturing signal VS represents a signal that is generated in the image processing circuit 103 at the side of the image processing apparatus body 102, determines the beginning of a horizontal scanning direction for image data ID based on the operation timing of horizontal synchronization signal HD, and determines capturing period d10 for effective image data.

When there is no noise NS entering horizontal synchronization signal HD, image capturing signal VS starts capturing effective image data at specified timing t1 after horizontal synchronization signal HD rises. The image processing circuit 103 can therefore capture the effective image data output from the image reading apparatus 101 at correct timings.

Figure 11:
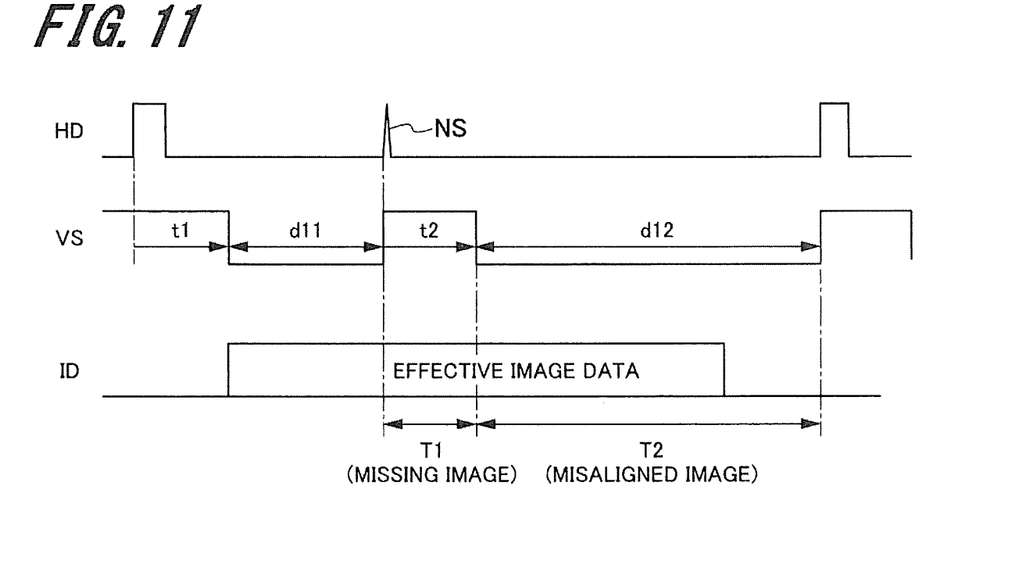
FIG. 11 illustrates operation timing for horizontal synchronization signal HD, image capturing signal VS, and image data ID when noise NS enters horizontal synchronization signal HD that passes through an FFC.

FIG. 11 illustrates operation timing for horizontal synchronization signal HD, image capturing signal VS, and image data ID when noise NS enters horizontal synchronization signal HD that passes through the FFC 104.

As illustrated in FIG. 11, noise NS has the same polarity as an active polarity of horizontal synchronization signal HD and enters horizontal synchronization signal HD whose signal level is low. In this case, the image processing circuit 103 incorrectly detects noise NS as a rising state of horizontal synchronization signal HD. At the time of detecting noise NS, the image processing circuit 103 once resets image capturing period d1 settled based on the rise of horizontal synchronization signal HD and re-generates image capturing signal VS at specified timing t2 from the rise of noise NS. Image capturing period d12 corresponding to the rise of noise NS is re-settled.

The image processing circuit 103, therefore, does not capture the effective image data corresponding to range T1 in FIG. 11 belonging to image data ID output from the image reading apparatus 101. The image processing circuit 103 captures the effective image data corresponding to range T2 in FIG. 11 as the effective image data on the inserted next line. This causes a missing image or a misaligned image.

Figure 12:
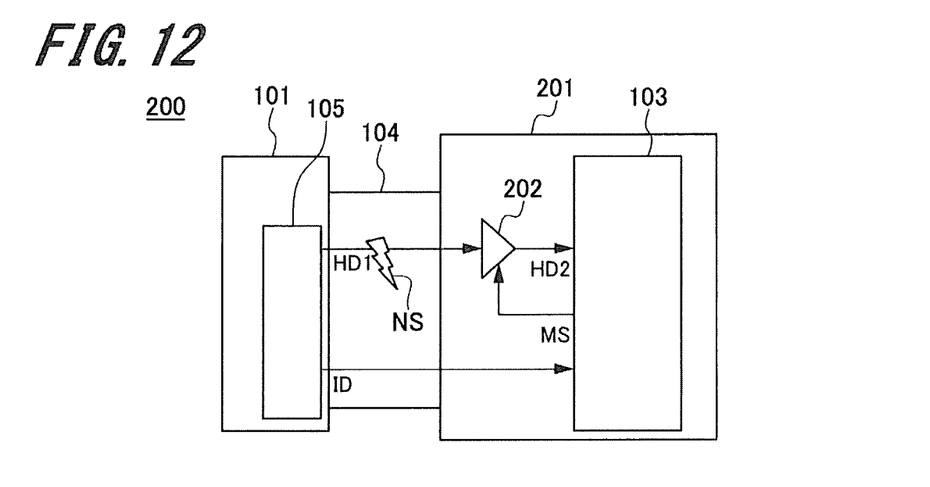
FIG. 12 is a schematic configuration diagram illustrating the image processing apparatus using mask signal MS to eliminate noise NS.
Figure 13:
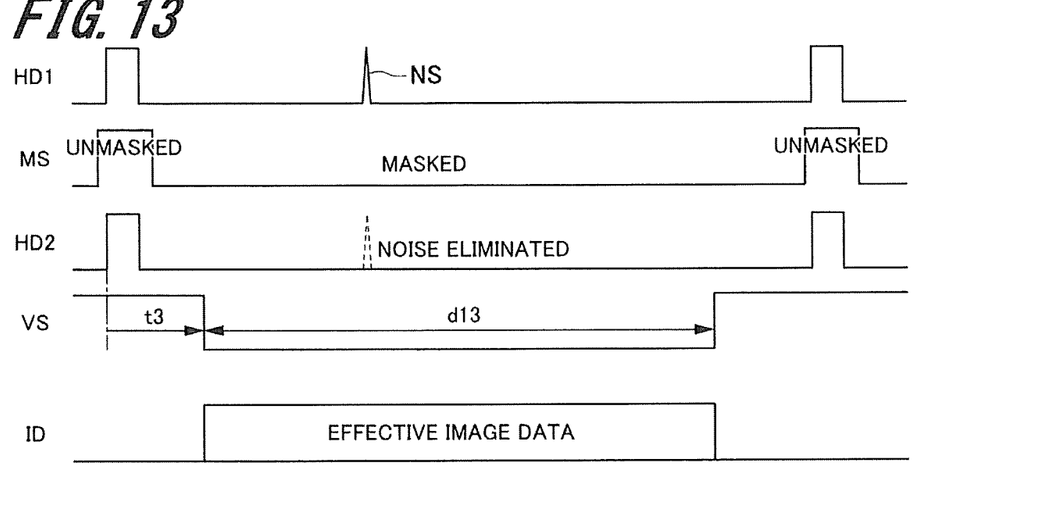
FIG. 13 is a diagram illustrating an operation timing chart for the image processing apparatus illustrated in FIG. 12.

As a solution to the issue illustrated in FIG. 11, the generally used technology generates a mask signal that disrupts horizontal synchronization signal HD at a specified timing. FIG. 12 is a partial circuit diagram illustrating a schematic configuration of an image processing apparatus 200 using mask signal MS to eliminate noise NS. FIG. 13 is a diagram illustrating an operation timing diagram for the image processing apparatus 200 illustrated in FIG. 12.

According to the example in FIG. 12, the image processing circuit 103 generates mask signal MS to mask a specified period including the period during which horizontal synchronization signal HD1 maintains the high signal level. The control substrate of the image processing apparatus body 201 includes a buffer 202 that determines whether to pass or disrupt horizontal synchronization signal HD1 based on mask signal MS. When mask signal MS maintains the high signal level, the buffer 202 allows horizontal synchronization signal HD1 to pass. When mask signal MS causes the low signal level, the buffer 202 disrupts horizontal synchronization signal HD1.

If a noise enters when horizontal synchronization signal HD1 generated from the image reading apparatus 101 causes the low signal level, the buffer 202 generates second horizontal synchronization signal HD2 by eliminating the noise from horizontal synchronization signal HD1 and outputs second horizontal synchronization signal HD2 to the image processing circuit 103.

The image processing circuit 103 generates image capturing signal VS corresponding to specified timing t3 after a rise of new second horizontal synchronization signal HD2 devoid of noise NS. Image capturing period d13 for the effective image data is settled. The image processing circuit 103 can capture image data ID output from the image reading apparatus 101 at a correct timing. This can prevent a missing image or a misaligned image.

Figure 14:
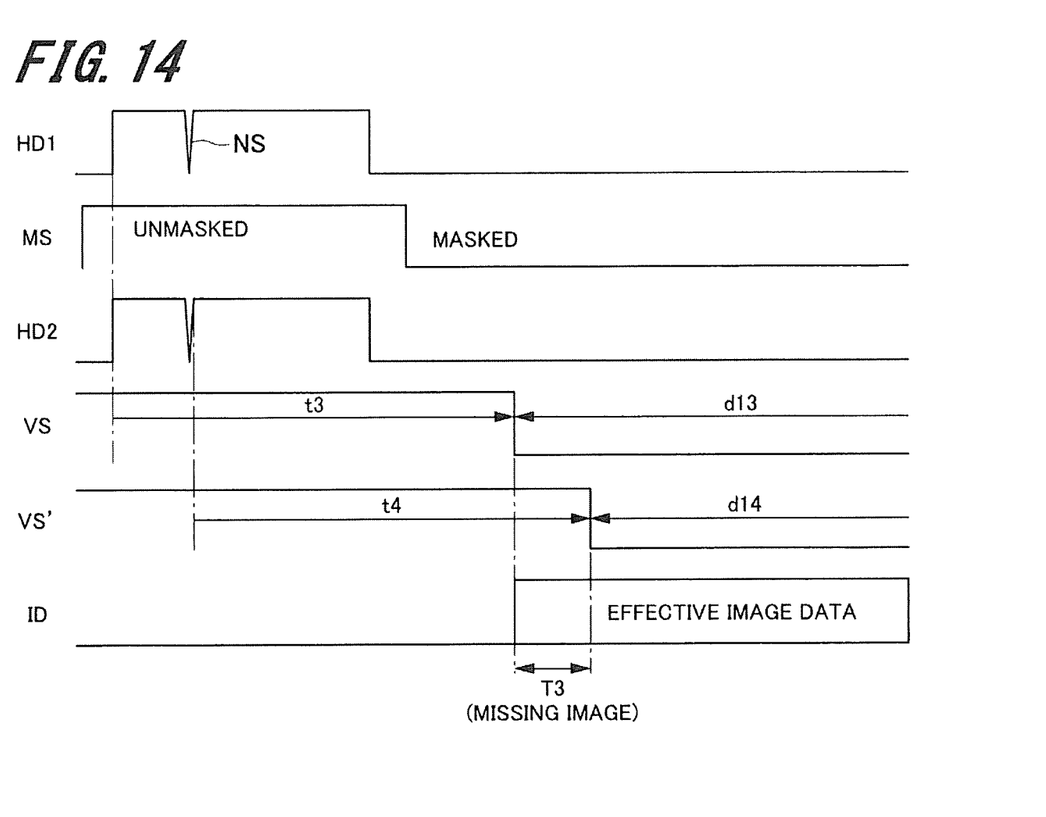
FIG. 14 is a diagram illustrating operation timing for signals when the image processing apparatus in FIG. 12 suffers from the entry of a noise having a polarity opposite to an active polarity of horizontal synchronization signal HD1 during a period in which horizontal synchronization signal HD1 maintains a high signal level.

According to the example in FIG. 12, however, the mask is inactivated while horizontal synchronization signal HD maintains the high signal level. A noise cannot be eliminated during the period that inactivates the mask. FIG. 14 is a diagram illustrating operation timing for signals when the image processing apparatus 200 in FIG. 12 suffers from the entry of a noise having a polarity opposite to the active polarity of horizontal synchronization signal HD1 during a period in which horizontal synchronization signal HD1 maintains the high signal level.

As illustrated in FIG. 14, noise NS enters during a period to inactivate the mask. Noise NS during the period of inactivating the mask is superimposed over second horizontal synchronization signal HD2 output from the buffer 202. In this case, horizontal synchronization signal HD1 temporarily goes low due to the entry of noise NS. After horizontal synchronization signal HD1 goes high again, image capturing signal VS' is generated at specified timing t4 to settle capturing period d14 for the effective image data. This causes a difference in positions to start capturing an image between image capturing signal VS without noise and image capturing signal VS' with the entry of the noise. This also causes a difference between the beginning of a horizontal scanning direction for the effective image data output from the image reading apparatus 101 and the position of image capturing signal VS' to start capturing the image. The effective image data is subject to a missing image corresponding to range T3 in FIG. 14.

Meanwhile, the technology disclosed in Patent Literature 1 can ignore a falling state due to the noise even when the noise lowers the horizontal synchronization signal in the high state. It is possible to appropriately determine one cycle of horizontal scanning. However, the technology disclosed in Patent Literature 1 changes the timing to detect a horizontal synchronization signal if a noise enters simultaneously with the rise of the horizontal synchronization signal to change the signal level to high. An image is misaligned even when the technology disclosed in Patent Literature 1 is used.

As above, the examples in FIGS. 9 through 14 illustrate the entry of a noise into an FFC. However, a similar issue develops when a noise occurs at any timing when a horizontal synchronization signal is transmitted to the image processing circuit. The image processing apparatus, therefore, requires eliminating an entering noise until the horizontal synchronization signal generated from the image reading apparatus reaches the image processing circuit.

It is an object of the present invention to reliably eliminate a noise entering a horizontal synchronization signal generated from an image reader (apparatus) and avoid a misaligned image or a missing image.

In order to solve the above-mentioned issue and achieve the above-mentioned object, according to an aspect of the present invention, an image processing apparatus reflecting one aspect of the present invention includes an image reader, a noise canceller, and an image processor. The image reader reads an image, outputs image data, and generates a horizontal synchronization signal. The noise canceller generates a noise-canceling signal to eliminate a noise entering a horizontal synchronization signal and eliminates a noise from the horizontal synchronization signal. The image processor captures effective image data out of image data transferred from the image reader correspondingly to the timing when the horizontal synchronization signal changes from a first signal level to a second signal level. The noise canceller generates a noise-canceling signal from a noise detection signal or image data generated in the image reader.

An image reading apparatus includes an image reader and a noise canceller. The image reader reads an image, outputs image data, and generates a horizontal synchronization signal. The noise canceller generates a noise-canceling signal to eliminate a noise entering the horizontal synchronization signal and eliminates a noise from the horizontal synchronization signal. The noise canceller generates a noise-canceling signal from a noise detection signal or image data generated in the image reader.

An image forming apparatus includes the above-mentioned image processing apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Hereinafter, one or more embodiments of the present invention will be described with reference to the drawings. However, the scope of the invention is not limited to the disclosed embodiments.

The description below explains examples of the image processing apparatus, the image reading apparatus, and the image forming apparatus according to the embodiments of the present invention. The present invention is not limited to the examples described below. Mutually corresponding members are designated by the same reference numerals in the diagrams to be described later. The description follows the order below.

1. Image processing apparatus according to the first embodiment
 1-1. A configuration of the image processing apparatus
 1-2. Image processing method
2. Image processing apparatus according to the second embodiment
 2-1. A configuration of the image processing apparatus
 2-2. Image processing method
3. Image processing apparatus according to the third embodiment
 3-1. A configuration of the image processing apparatus
 3-2. Image processing method 1. Image Processing Apparatus According to the First Embodiment (an Example of Generating a Noise Detection Signal from an Image Reader)

1-1. A Configuration of the Image Processing Apparatus

Figure 1:
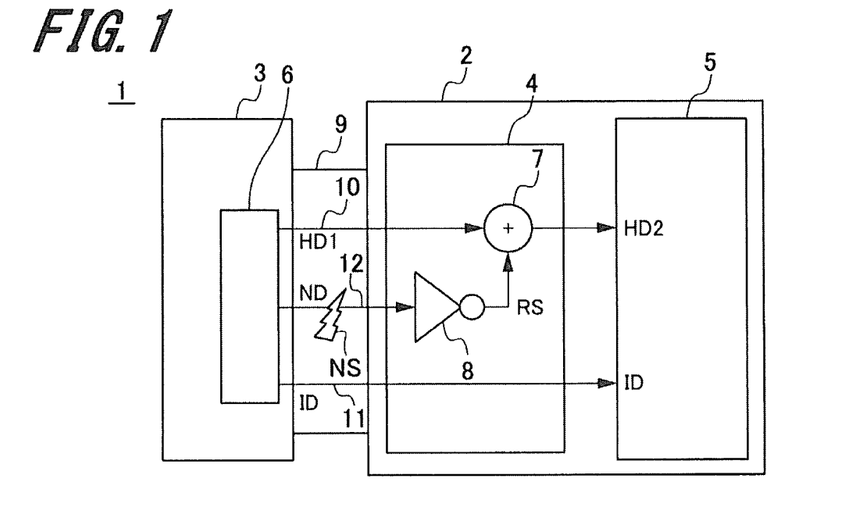
FIG. 1 is a diagram illustrating a schematic configuration of an image processing apparatus according to a first embodiment of the present invention.
Figure 2:
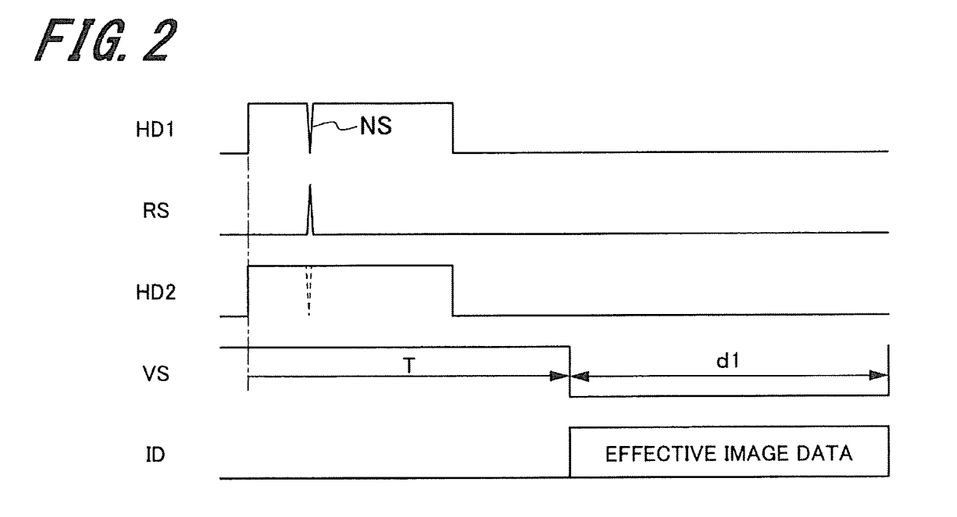
FIG. 2 is a diagram illustrating operation timing of the image processing apparatus according to the first embodiment of the present invention.

FIG. 1 is a diagram illustrating a schematic configuration of an image processing apparatus 1 according to the first embodiment of the present invention. FIG. 1 partially includes a circuit diagram. FIG. 2 is a diagram illustrating operation timing of the image processing apparatus 1 according to the first embodiment of the present invention.

The image processing apparatus 1 according to the present embodiment is applicable to copiers, printers, facsimile machines, and printing machines. As illustrated in FIG. 1, the image processing apparatus 1 according to the embodiment includes an image reader 3, an image processing apparatus body 2, and an FFC 9 configuring a wiring portion electrically connecting the image reader 3 with the image processing apparatus body 2.

The image reader 3 includes an imaging apparatus 6 configured as CCD or CIS, for example, and reads a document placed on a document table (unshown) while moving in a specified direction. The direction of moving the image reader 3 is assumed to be a vertical scanning direction and the direction orthogonal to the vertical scanning direction is assumed to be a horizontal scanning direction. The imaging apparatus 6 includes, though unshown, an imaging element including a plurality of pixels placed in the horizontal scanning direction and an output circuit (AFE) that A/D-converts an image signal generated in the imaging element and outputs the converted image signal.

The imaging apparatus 6 successively transfers an image signal generated in the imaging element by using first horizontal synchronization signal HD1 and a vertical synchronization signal (unshown) generated in the output circuit. The output circuit A/D-converts the image signal to generate image data ID. Image data ID is transferred to an image processor 5 provided at the side of the image processing apparatus body 2 via an image data line 11.

The imaging apparatus 6 in the image reader 3 generates noise detection signal ND. Noise detection signal ND detects noise NS entering the FFC 9. The imaging apparatus 6 transmits noise detection signal ND to a noise canceller 4 in the image processing apparatus body 2 via a noise detection signal line 12 provided for the FFC 9.

When noise NS does not enter the FFC 9, noise detection signal ND maintains a specified value. When noise NS enters the FFC 9, noise detection signal ND changes to a waveform corresponding to the rise and the fall of noise NS to extract noise NS.

First horizontal synchronization signal HD1 generated in the imaging apparatus 6 of the image reader 3 is used to determine the beginning of image data ID in the image processor 5 of the image processing apparatus body 2 in the horizontal scanning direction. First horizontal synchronization signal HD1 generated in the imaging apparatus 6 is therefore transmitted to the side of the image processing apparatus body 2 via a horizontal synchronization signal line 10 provided for the FFC 9.

According to the present embodiment, the horizontal synchronization signal line 10, the image data line 11, and the noise detection signal line 12 are connected to the side of the image processing apparatus body 2 from the imaging apparatus 6 via the FFC 9.

The image processing apparatus body 2 includes the noise canceller 4 and the image processor 5. The noise canceller 4 includes a circuit that eliminates a noise entering first horizontal synchronization signal HD1 transmitted to the side of the image processing apparatus body 2 from the imaging apparatus 6 of the image reader 3 via the FFC 9. Specifically, the noise canceller 4 includes a NOT circuit 8 and an adder 7. The NOT circuit 8 is supplied with noise detection signal ND via the noise detection signal line 12. The NOT circuit 8 outputs noise-canceling signal RS generated by reversing noise detection signal ND.

The adder 7 adds noise-canceling signal RS output from the NOT circuit 8 and first horizontal synchronization signal HD1 input via the horizontal synchronization signal line 10 to generate second horizontal synchronization signal HD2 devoid of noise NS and transmits it to the image processor 5.

The image processor 5 includes an integrated circuit that applies image processing to image data ID transmitted from the image reader 3. The image processor 5 determines the start position of the horizontal scanning direction out of image data ID transmitted from the imaging apparatus 6 correspondingly to second horizontal synchronization signal HD2 and generates image capturing signal VS (FIG. 2) that determines timings to start and stop capturing the effective image data. The image processor 23 captures the effective image data out of image data ID during capturing period d1 (FIG. 2) specified by image capturing signal VS for the effective image data.

1-2. Image Processing Method

With reference to FIG. 2, the description below explains an image processing method in the image processing apparatus 1 according to the present embodiment. FIG. 2 illustrates operation timings of signals when noise NS enters first horizontal synchronization signal HD1 via the FFC 9 while first horizontal synchronization signal HD1 maintains the high signal level (second signal level according to the present invention). The description below explains an entry of noise NS having a polarity opposite to the active polarity of first horizontal synchronization signal HD1.

As illustrated in FIG. 2, noise NS enters the FFC 9 to cause a partial fall during a period in which first horizontal synchronization signal HD1 maintains the high signal level. The noise detection signal line 12 also passes through the FFC 9 similarly to the horizontal synchronization signal line 10. Noise NS also enters noise detection signal ND similarly to first horizontal synchronization signal HD1. Noise detection signal ND, therefore, changes to a waveform corresponding to noise NS. Noise detection signal ND is input to the NOT circuit 8 and is reversed to generate noise-canceling signal RS illustrated in FIG. 2.

The adder 7 adds noise-canceling signal RS output from the NOT circuit 8 and first horizontal synchronization signal HD1 to cancel the component of noise NS entering first horizontal synchronization signal HD1. The adder 7 thereby outputs second horizontal synchronization signal HD2 devoid of noise NS. Second horizontal synchronization signal HD2 output from the adder 7 is then input to the image processor 5. The image processor 5 generates image capturing signal VS at specified timing T corresponding to the rise of second horizontal synchronization signal HD2. The image processor 5 captures effective image data out of image data ID transmitted from image reader 3 during capturing period d1 corresponding to the generated image capturing signal VS.

According to the present embodiment, the noise canceller 4 generates noise-canceling signal RS corresponding to noise NS entering first horizontal synchronization signal HD1. Noise-canceling signal RS is used to generate second horizontal synchronization signal HD2 by eliminating noise NS from first horizontal synchronization signal HD1. It is possible to avoid a missing image or a misaligned image due to an entry of noise NS.

The example in FIG. 2 eliminates noise NS that occurs when first horizontal synchronization signal HD1 maintains the high signal level. However, the present embodiment is not limited thereto. It is also possible to eliminate a noise that occurs when first horizontal synchronization signal HD1 maintains the low signal level (first signal level according to the present invention). Further, the example in FIG. 2 describes the entry of noise NS having a polarity opposite to the active polarity of first horizontal synchronization signal HD1. It is also possible to eliminate entered noise NS having a polarity equal to the active polarity of first horizontal synchronization signal HD1.

Generally, a high-grade image forming apparatus such as A3 machines appropriate to A3-size image data can prevent a noise entry by using a shielded cable for wiring. However, A4 machines appropriate to A4-size image data need to use affordable non-shielded cables because an increased cost lowers the competitiveness. The image processing apparatus 1 according to the present embodiment can eliminate a noise entering the FFC 9 and does not need to use an expensive shielded cable, making it possible to prevent an increase in costs.

The present embodiment provides the noise canceller 4 for the image processor 5 under the assumption of noise NS entering the FFC 9 but is not limited thereto. The image reader 3 provided with the noise canceller 4 can eliminate a noise from first horizontal synchronization signal HD1 output from the image reader 3. Namely, an image reading apparatus including the image reader 3 and the noise canceller 4 according to the present embodiment can eliminate a noise that occurs in the image reading apparatus and enters first horizontal synchronization signal HD1.

According to the present embodiment, the image reader 3 generates noise detection signal ND and acquires noise-canceling signal RS based on noise detection signal ND. However, the image reader 3 may not be able to generate noise detection signal ND. For example, the image reader 3 and the image processing apparatus body 2 may be developed independently and the image reader 3 may use an externally developed product. In such a case, the image reader 3 cannot be provided with a circuit to generate noise detection signal ND.

The description below explains an example of providing a circuit configuration to eliminate noise NS for the image processing apparatus body 2 only.

2. Second Embodiment (an Example of Extracting Noise Components from the Image Data Line)

2-1. A Configuration of the Image Processing Apparatus

Figure 3:
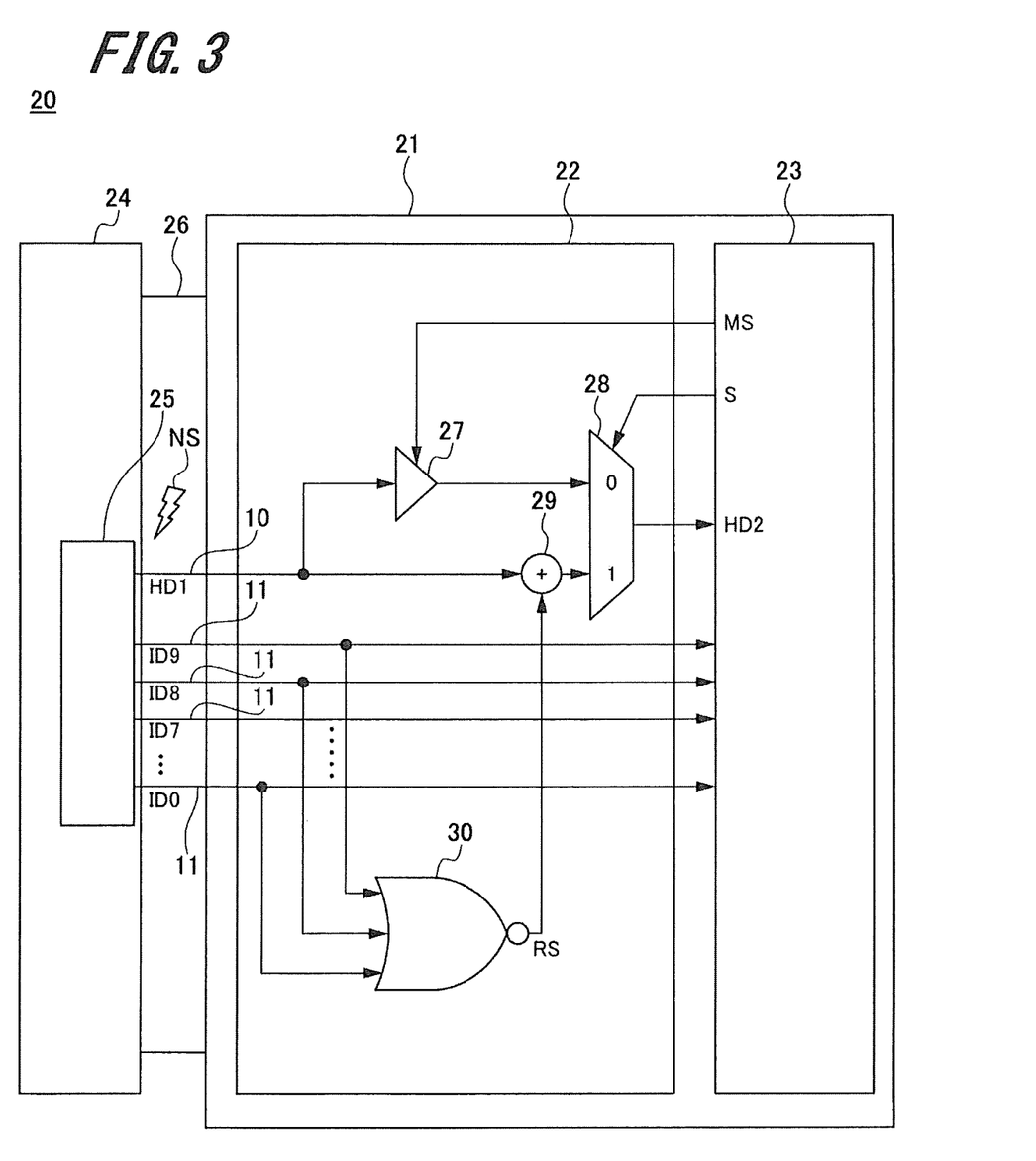
FIG. 3 is a diagram illustrating a schematic configuration of the image processing apparatus according to a second embodiment of the present invention.
Figure 4:
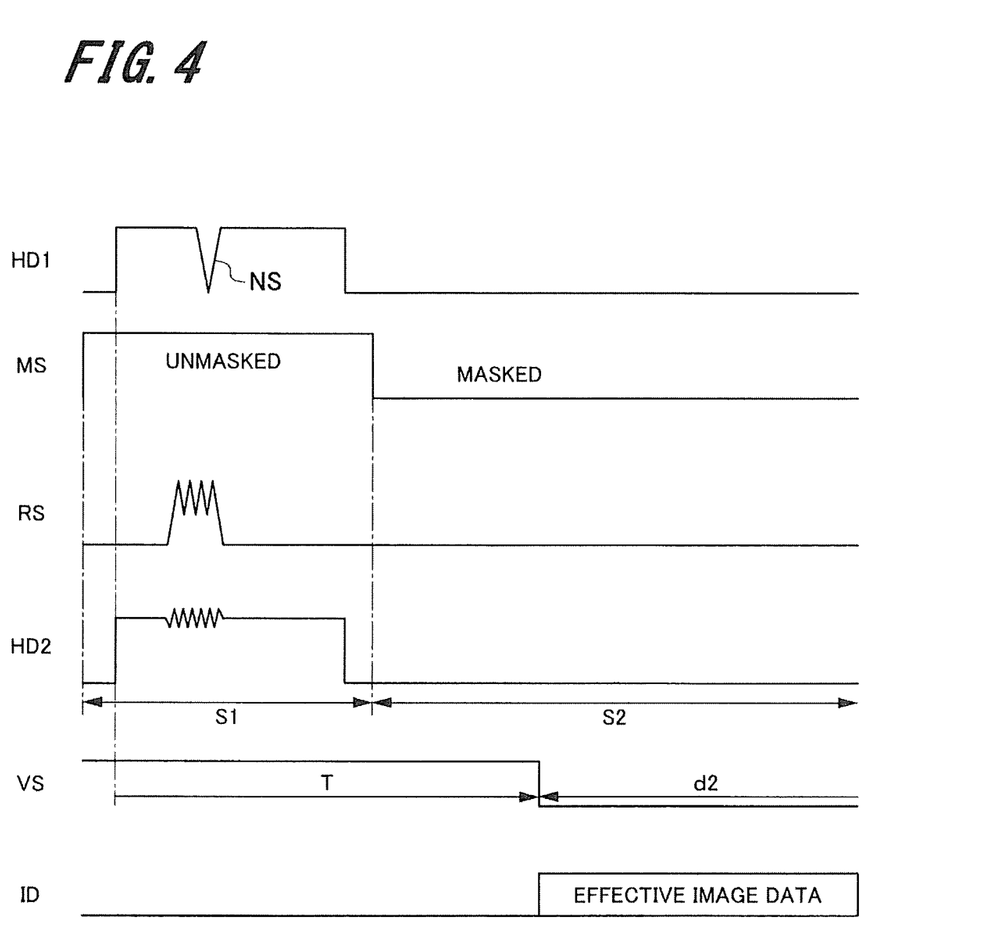
FIG. 4 is a diagram illustrating operation timing of the image processing apparatus according to the second embodiment of the present invention.

FIG. 3 is a diagram illustrating a schematic configuration of an image processing apparatus 20 according to the second embodiment of the present invention. FIG. 4 is a diagram illustrating operation timing of the image processing apparatus 20 according to the second embodiment of the present invention. Mutually corresponding parts in FIGS. 1 through 4 are depicted by the same reference numerals and a duplicate description is omitted for simplicity.

As illustrated in FIG. 3, the image processing apparatus 20 according to the present embodiment includes an image reader 24, an image processing apparatus body 21, and an FFC 26 electrically connecting the image reader 24 and the image processing apparatus body 21.

Similarly to the first embodiment, the image reader 24 according to the present embodiment includes an imaging apparatus 25 including an imaging element and an output circuit. The image reader 24 according to the present embodiment differs from the image reader 3 according to the first embodiment only in that the imaging apparatus 25 does not generate a noise detection signal. The other configurations are unchanged and a duplicate description is omitted for simplicity. The present embodiment provides an example of including the image data line 11 that transmits image data ID0 through ID9 corresponding to ten gradations.

According to the present embodiment, the horizontal synchronization signal line 10 transmits first horizontal synchronization signal HD1 output from the imaging apparatus 25. A plurality of image data lines 11 transmit image data ID0 through ID9 corresponding to ten gradations. The horizontal synchronization signal line 10 and the image data lines 11 are connected to the image processing apparatus body 21 via the FFC 26.

The image processing apparatus body 21 includes a noise canceller 22 and an image processor 23. The noise canceller 22 includes a circuit that eliminates noise NS entering first horizontal synchronization signal HD1 transmitted to the image processing apparatus body 21 from the imaging apparatus 25 of the image reader 24 via the FFC 26. The present embodiment includes a NOR circuit 30, an adder 29, a buffer 27, and a selector 28.

The NOR circuit 30 is supplied with image data ID0 through ID9 from the image data lines 11. The NOR circuit 30 outputs signals generated by reversing image data ID0 through ID9. A signal output from the NOR circuit 30 is used as noise-canceling signal RS during specified period S1 (a first period according to the present invention).

The adder 29 is supplied with noise-canceling signal RS output from the NOR circuit 30 and first horizontal synchronization signal HD1. The adder 29 outputs a value as the sum of noise-canceling signal RS and first horizontal synchronization signal HD1. The buffer 27 is supplied with first horizontal synchronization signal HD1 and mask signal MS output from the image processor 23. When mask signal MS maintains the low signal level, the buffer 27 according to the present embodiment disrupts a passage of first horizontal synchronization signal HD1 and outputs a signal maintaining a specified value (low level). When mask signal MS maintains the high signal level, the buffer 27 permits a passage of first horizontal synchronization signal HD1 and directly outputs first horizontal synchronization signal HD1 input to the buffer 27.

The selector 28 is supplied with an output signal from the buffer 27 and an output signal from the adder 29. Selection signal S generated in the image processor 23 causes the selector 28 to select the output signal from the buffer 27 or the output signal from the adder 29 and output the selected signal. If selection signal S is "0," the selector 28 according to the present embodiment outputs the signal input from the buffer 27 as second horizontal synchronization signal HD2 to the image processor 23. If selection signal S is "1," the selector 28 outputs the signal input from the adder 29 as second horizontal synchronization signal HD2 to the image processor 23.

The image processor 23 includes an integrated circuit that applies image processing to image data ID0 through ID9 transmitted from the image reader 24. The image processor 23 generates mask signal MS and selection signal S to be output to the noise canceller 22.

Mask signal MS disrupts a passage of first horizontal synchronization signal HD1 only during a specified period. According to the present embodiment, mask signal MS is designed to change the signal level from low to high one clock before the signal level of first horizontal synchronization signal HD1 goes high. Mask signal MS is designed to change the signal level from high to low again one clock after the signal level of first horizontal synchronization signal HD1 goes low.

According to the present embodiment, the buffer 27 disrupts (masks) a passage of first horizontal synchronization signal HD1 during period S2 (a second period according to the present invention) in which mask signal MS maintains the low signal level. The buffer 27 permits (unmasks) a passage of first horizontal synchronization signal HD1 during period S1 in which mask signal MS maintains the high signal level.

Selection signal S selects the selector 28 set to "0" during period S2 in which mask signal MS disrupts first horizontal synchronization signal HD1. Selection signal S selects the selector 28 set to "1" during period S1 in which mask signal MS releases the disruption of first horizontal synchronization signal HD1.

The image processor 23 includes an integrated circuit that applies image processing to image data ID0 through ID9 transmitted from the image reader 24. As illustrated in FIG. 4 to be described later, the image processor 5 determines the start position of the horizontal scanning direction out of image data ID0 through ID9 transmitted from the imaging apparatus 25 in accordance with second horizontal synchronization signal HD2. The image processor 5 generates image capturing signal VS that determines timings to start and stop capturing the effective image data. The image processor 23 captures the effective image data out of image data ID0 through ID9 during capturing period d2 settled by image capturing signal VS for the effective image data.

2-2. Image Processing Method

With reference to FIG. 4, the description below explains the image processing method in the image processing apparatus 20 according to the present embodiment. The following describes the operation timing for each signal when noise NS enters first horizontal synchronization signal HD1 over the FFC 26 on condition that noise NS has a polarity opposite to the active polarity of first horizontal synchronization signal HD1.

Unmasking the First Horizontal Synchronization Signal

As illustrated in FIG. 4, noise NS enters first horizontal synchronization signal HD1 during period S1 in which mask signal MS unmasks first horizontal synchronization signal HD1. During period S1, selection signal S selects the selector 28 set to "1."

Outside capturing period d2 for the effective image data, image data ID0 through ID9 output from the image data line 11 provide dummy images and maintain a specified value (low level) when noise NS does not occur. The horizontal synchronization signal line 10 and the image data line 11 pass through the same FFC 26 and are subject to the same noise NS. Only a noise NS component occurs in image data ID0 through ID9 when noise NS enters first horizontal synchronization signal HD1 outside capturing period d2 for the effective image data. It is, therefore, possible to extract the noise NS component from image data ID0 through ID9.

According to the present embodiment, mask signal MS to be described later unmasks first horizontal synchronization signal HD1 outside capturing period d2 for the effective image data. A signal output from the NOR circuit 30 can be used as noise-canceling signal RS. During period S1, the present embodiment can eliminate noise NS entering first horizontal synchronization signal HD1 by allowing the adder 29 to add noise-canceling signal RS output from the NOR circuit 30 to first horizontal synchronization signal HD1. During period S1, the signal output from the adder 29 is output via the selector 28. Second horizontal synchronization signal HD2 acquired by eliminating noise NS from first horizontal synchronization signal HD1 is output to the image processor 23.

First Horizontal Synchronization Signal Masked by the Mask Signal

The description below explains an entry of a noise into first horizontal synchronization signal HD1 during period S2 in which mask signal MS masks first horizontal synchronization signal HD1. During period S2, selection signal S selects the selector 28 set to "0."

During period S2, mask signal MS masks first horizontal synchronization signal HD1. Even if noise NS occurs, the buffer 27 outputs the signal at a specified value (low level) without outputting a noise NS component. The selector 28 outputs the specified value as second horizontal synchronization signal HD2 to the image processor 23 without being affected by noise NS, if any, that enters first horizontal synchronization signal HD1 over the FFC 26 during period S2.

The image processor 23 generates image capturing signal VS at specified timing T corresponding to the rise of second horizontal synchronization signal HD2. The image processor 23 captures the effective image data transmitted from the image reader 24 in response to image capturing signal VS. According to the present embodiment, the noise canceller 22 can generate second horizontal synchronization signal HD2 by eliminating noise NS from first horizontal synchronization signal HD1 during periods S1 and S2. It is possible to avoid a missing image or a misaligned image during image capturing period d2.

According to the present embodiment, the NOR circuit 30 acquires noise-canceling signal RS from a plurality of image data ID0 through ID9. However, any one of image data ID0 through ID9 may be selected to acquire noise-canceling signal RS. The present embodiment can alleviate the effect of signal delays due to different wiring lengths by acquiring noise-canceling signal RS from a plurality of image data ID0 through ID9. Noise NS can be eliminated more reliably.

Mask signal MS needs to be inactivated during a specified period in order to acquire first horizontal synchronization signal HD1 at the image processor 23 when mask signal MS masks first horizontal synchronization signal HD1 during a specified period as above. The example illustrated in FIG. 12, therefore, causes a missing image or a misaligned image when mask signal MS is inactivated to allow a noise entry.

A spread spectrum clock is generally used for a clock signal generated in the image reader 24 in order to prevent a radiation noise. First horizontal synchronization signal HD1 is generated in synchronization with the clock signal generated in the image reader 24. Image capturing signal VS is generated in synchronization with the clock signal generated in the image processor 23. Therefore, it is difficult for the image processor 23 to generate mask signal MS completely synchronized with first horizontal synchronization signal HD1 generated in the image reader 24.

It is difficult to ensure complete conformity between first horizontal synchronization signal HD1 and mask signal MS due to different pattern wiring lengths, for example. For these reasons, the period to inactivate mask signal MS needs to be designed by providing a margin to the timing for first horizontal synchronization signal HD1 to pass. The example illustrated in FIG. 12 provides the period in which mask signal MS is inactivated when mask signal MS differs from first horizontal synchronization signal HD1. Although a missing image does not occur, a misaligned image is likely to occur when noise NS enters immediately before first horizontal synchronization signal HD1 rises.

The present embodiment can avoid a misaligned image during the period to inactivate the mask even when first horizontal synchronization signal HD1 and mask signal MS cannot be completely synchronized and the mask needs to be inactivated during a specified period in order to allow first horizontal synchronization signal HD1 to pass.

Further, the present embodiment can eliminate noise NS entering first horizontal synchronization signal HD1 during all periods even when the image reader 24 cannot generate a noise detection signal as described in the first embodiment.

The present embodiment keeps using the configuration according to the related art for the image reader 24. Therefore, the image processing apparatus body 21 configured according to the present embodiment can be used in combination with an image reader according to the related art.

According to the present embodiment, the noise canceller 22 is provided for the image processor 23 based on the assumption of eliminating noise NS occurring over the FFC 26. However, the noise canceller 22 may be provided for the image reader 24. In this case, noise NS occurring in the image reader 24 can be eliminated from first horizontal synchronization signal HD1 and the image reader 24 can output first horizontal synchronization signal HD1 devoid of noise NS.

3. Third Embodiment (an Example of Extracting Noise Components from the Image Data Line)

3-1. A Configuration of the Image Processing Apparatus

Figure 5:
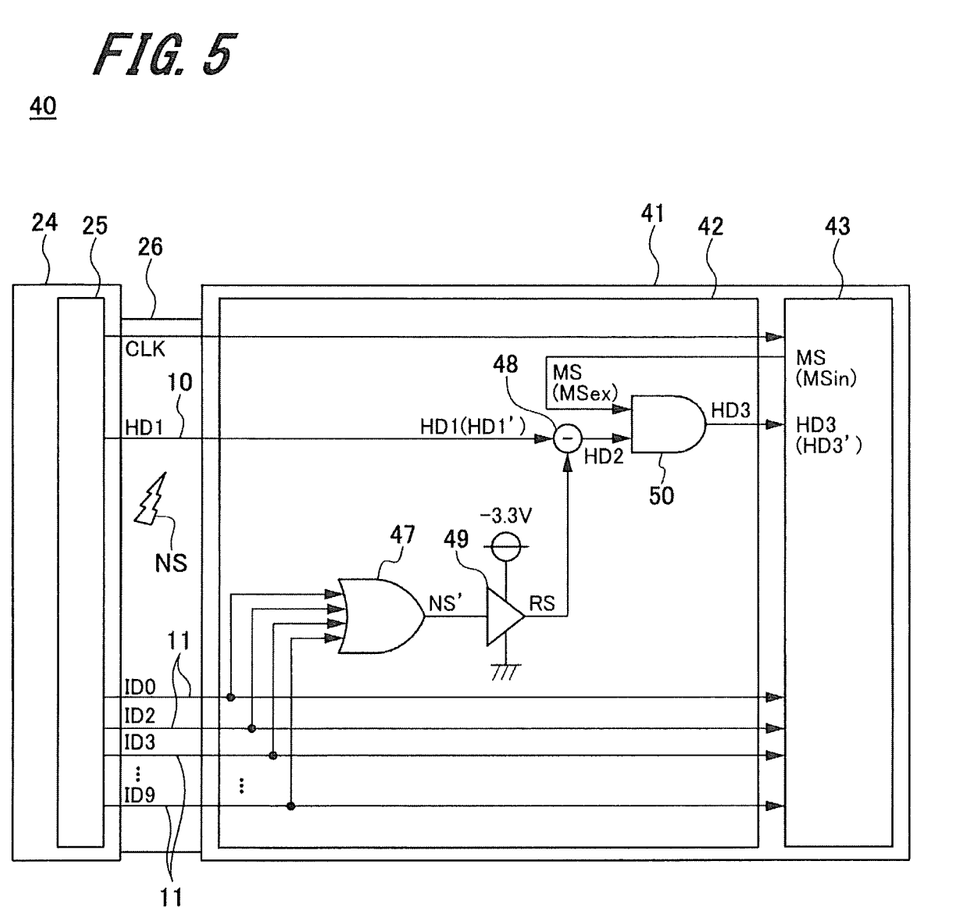
FIG. 5 is a diagram illustrating a schematic configuration of the image processing apparatus according to a third embodiment of the present invention.

FIG. 5 is a diagram illustrating a schematic configuration of an image processing apparatus 40 according to the third embodiment of the present invention.

As illustrated in FIG. 5, the image processing apparatus 40 according to the present embodiment includes the image reader 24, an image processing apparatus body 41, and the FFC 26 electrically connecting the image reader 24 and the image processing apparatus body 41. The configuration of the image reader 24 according to the present embodiment is similar to that in FIG. 3 and a duplicate description is omitted for simplicity.

The image processing apparatus body 41 includes a noise canceller 42 and an image processor 43. The noise canceller 42 includes a circuit that eliminates noise NS entering first horizontal synchronization signal HD1 transmitted to the image processing apparatus body 41 from the imaging apparatus 25 of the image reader 24 via the FFC 26. According to the present embodiment, the noise canceller 42 includes an OR circuit 47, a buffer 49, a subtractor 48, and an AND circuit 50.

The OR circuit 47 is supplied with image data ID0 through ID9 from a plurality of image data lines 11. The OR circuit 47 outputs noise signal NS', namely, noise NS extracted from each image data line 11 during a specified period.

The buffer 49 is supplied with noise signal NS' output from the OR circuit 47. The buffer 49 permits a passage of only noise signal NS' that is lower than or equal to a specified threshold value (−3.3 V or less in FIG. 5) so that noise signal NS' can be output. The signal output from the buffer 49 is used as noise-canceling signal RS according to the present embodiment.

The subtractor 48 is supplied with first horizontal synchronization signal HD1 transmitted from the imaging apparatus 25 via the FFC 26 and noise-canceling signal RS output from the buffer 49. The subtractor 48 outputs second horizontal synchronization signal HD2, namely, a value resulting from subtracting noise-canceling signal RS from first horizontal synchronization signal HD1.

The AND circuit 50 is supplied with second horizontal synchronization signal HD2 output from the subtractor 48 and mask signal MS output from the image processor 43. The AND circuit 50 outputs third horizontal synchronization signal HD3, namely, second horizontal synchronization signal HD2 during the period in which the mask is inactivated.

Similarly to the first embodiment, the image processor 43 includes an integrated circuit that applies image processing to image data ID0 through ID9 transmitted from the image reader 24 via the noise canceller 42. The image processor 43 generates mask signal MS output to the noise canceller 42.

Mask signal MS disrupts a passage of second horizontal synchronization signal HD2 in the AND circuit 50 only during a specified period. According to the present embodiment, mask signal MS is generated correspondingly to the rise of first horizontal synchronization signal HD1 and is designed to change the signal level from low to high one clock before the signal level of first horizontal synchronization signal HD1 goes high. Mask signal MS is designed to change the signal level from high to low again one clock after the signal level of first horizontal synchronization signal HD1 goes low.

Figure 6:
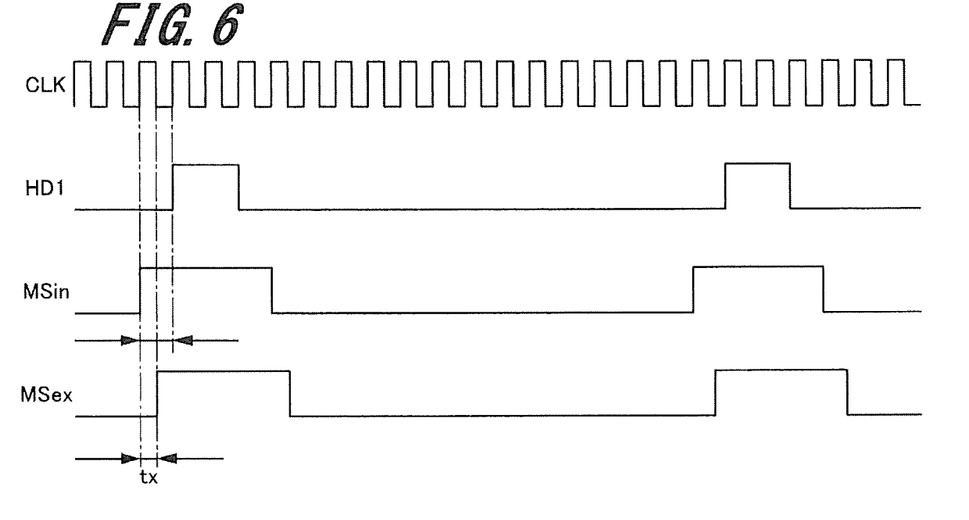
FIG. 6 is a diagram illustrating operation timing among clock signal CLK generated by an imaging apparatus, mask signal MSin at the time when generated by an image processor, mask signal MSex at the time when reaching an AND circuit, and first horizontal synchronization signal HD1 in the image processing apparatus according to the third embodiment of the present invention.

When reaching the AND circuit 50, mask signal MS generated in the image processor 43 rises slightly later than the timing one clock before first horizontal synchronization signal HD1 rises due to a delay in transmission over the substrate provided with the image processing apparatus body 41. FIG. 6 is a diagram illustrating operation timing among clock signal CLK generated by the imaging apparatus 25, mask signal MSin at the time when generated by the image processor 43, mask signal MSex at the time when reaching the AND circuit 50, and first horizontal synchronization signal HD1.

As illustrated in FIG. 6, the image processor 43 generates mask signal MSin that rises one clock before first horizontal synchronization signal HD1 rises correspondingly to the operation timing for first horizontal synchronization signal HD1. Due to a delay over the substrate, however, the timing for mask signal MSex reaching the AND circuit 50 delays by time tx from the rise of mask signal MSin generated by the image processor 43. As illustrated in FIG. 6, mask signal MSex input to the AND circuit 50 rises after the timing one clock before the timing to raise first horizontal synchronization signal HD1 and before the timing to raise first horizontal synchronization signal HD1.

Therefore, the present embodiment inactivates the mask after the timing one clock before the timing to raise first horizontal synchronization signal HD1 and before the timing to raise first horizontal synchronization signal HD1.

According to the present embodiment, the signal level of mask signal MSin changes from high to low at the timing one clock after first horizontal synchronization signal HD1 goes low.

According to the present embodiment, the AND circuit 50 directly outputs second horizontal synchronization signal HD2 input to the AND circuit 50 as third horizontal synchronization signal HD3 when mask signal MSex maintains the low signal level. A low signal is output as third horizontal synchronization signal HD3 when mask signal MSex maintains the high signal level. Third horizontal synchronization signal HD3 output from the AND circuit 50 conforms to first horizontal synchronization signal HD1 devoid of noise NS.

Similarly to the first embodiment, the image processor 43 generates image capturing signal VS (unshown) that determines timings to start and stop capturing the effective image data correspondingly to third horizontal synchronization signal HD3 devoid of noise NS transmitted via the noise canceller 42. The image processor 43 determines the start position of the horizontal scanning direction out of image data ID0 through ID9 transmitted from the imaging apparatus 25 correspondingly to the timing to raise third horizontal synchronization signal HD3 and thereby determines the capturing period for effective image data.

3-1. Image Processing Method

Figure 7:
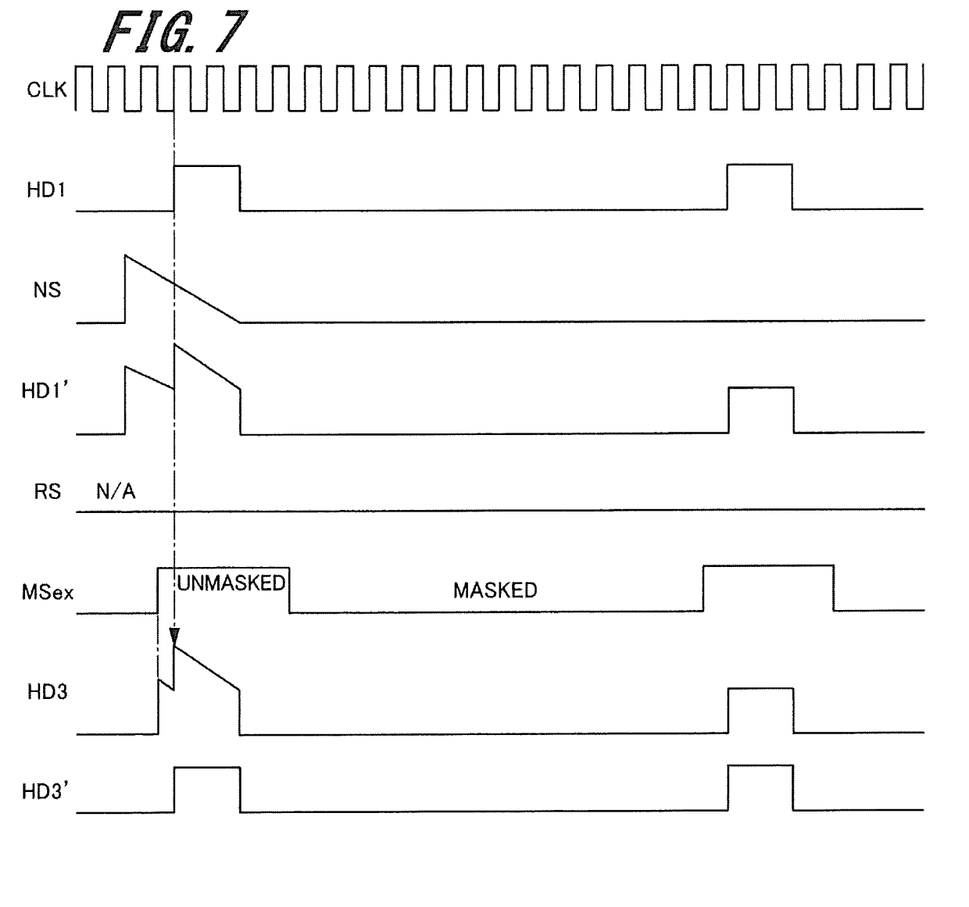
FIG. 7 is a diagram illustrating operation timing for signals according to the third embodiment when noise NS enters first horizontal synchronization signal HD1 over an FFC on condition that noise NS has a polarity equal to an active polarity of first horizontal synchronization signal HD1.
Figure 8:
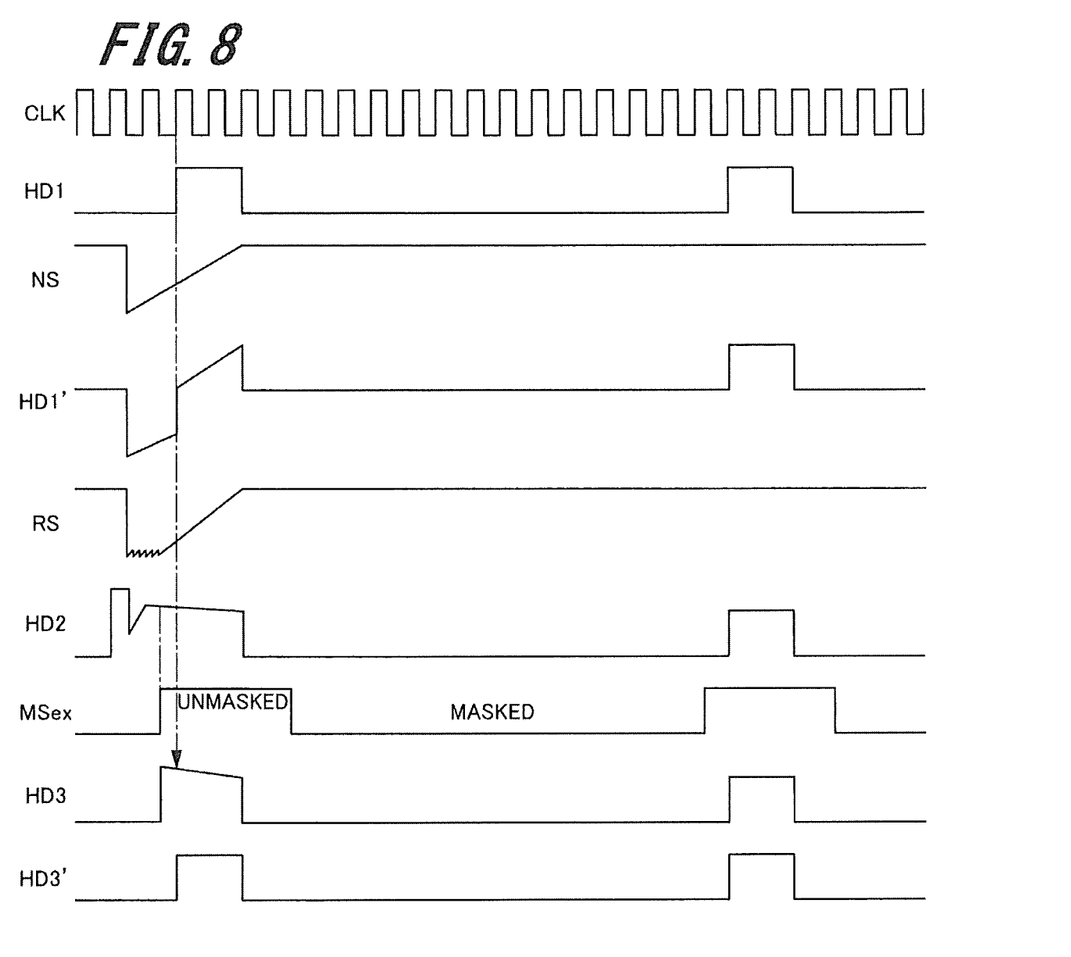
FIG. 8 is a diagram illustrating operation timing for signals according to the third embodiment when noise NS enters first horizontal synchronization signal HD1 over an FFC on condition that noise NS has a polarity opposite to an active polarity of first horizontal synchronization signal HD1.

With reference to FIGS. 7 and 8, the description below explains the image processing method in the image processing apparatus 40 according to the present embodiment. FIG. 7 is a diagram illustrating operation timing for signals when noise NS enters first horizontal synchronization signal HD1 over the FFC 26 on condition that noise NS has a polarity equal to the active polarity of first horizontal synchronization signal HD1. FIG. 8 is a diagram illustrating operation timing for signals when noise NS enters first horizontal synchronization signal HD1 over the FFC 26 on condition that noise NS has a polarity opposite to the active polarity of first horizontal synchronization signal HD1.

Entry of a noise having a polarity (plus) equal to the active polarity of the first horizontal synchronization signal With reference to FIG. 7, the description below explains a case where noise NS having a polarity equal to the active polarity of first horizontal synchronization signal HD1 enters the FFC 26 during the period in which mask signal MS inactivates the mask.

When noise NS enters the FFC 26, noise NS also enters first horizontal synchronization signal HD1 output from the imaging apparatus 25. The subtractor 48 of the noise canceller 42 is supplied with first horizontal synchronization signal HD1' comparable to first horizontal synchronization signal HD1 on which a noise NS component is superimposed.

When noise NS enters the FFC 26, similar noise NS also enters the image data line 11. Image data ID0 through ID9 superimposed with the noise component is input to the OR circuit 47. The OR circuit 47 outputs image data ID0 through ID9 superimposed with the noise NS component as noise signal NS'.

Noise signal NS' output from the OR circuit 47 is input to the buffer 49. According to the present embodiment, the buffer 49 disrupts a plus-polarity signal. When plus-polarity noise NS enters, noise-canceling signal RS from the buffer 49 is disrupted. First horizontal synchronization signal HD1' input to the subtractor 48 is directly output as second horizontal synchronization signal HD2 to the AND circuit 50.

While mask signal MSex maintains the high signal level, the AND circuit 50 inactivates the mask and outputs a value of second horizontal synchronization signal HD2 input to the AND circuit 50. While mask signal MSex maintains the low signal level, the AND circuit 50 masks second horizontal synchronization signal HD2 and outputs a low-level signal. Therefore, the AND circuit 50 outputs third horizontal synchronization signal HD3 having the waveform as illustrated in FIG. 7.

According to the present embodiment, as illustrated in FIG. 7, third horizontal synchronization signal HD3 output from the AND circuit 50 to the image processor 43 rises earlier than first horizontal synchronization signal HD1 output from the imaging apparatus 25 in terms of timing. However, the image processor 43 determines that third horizontal synchronization signal HD3 rises at the first timing when clock signal CLK rises to reach a specified threshold value or more. Therefore, the image processor 43 recognizes third horizontal synchronization signal HD3 as third horizontal synchronization signal HD3' illustrated in FIG. 7.

The image processor 43 generates an image capturing signal and determines the capturing period for effective image data based on third horizontal synchronization signal HD3' illustrated in FIG. 7. The effective image data can be captured at the same timing as the timing to raise first horizontal synchronization signal HD1 generated in the image reader. Therefore, it is possible to avoid a misaligned image or a missing image caused by a noise occurring on the horizontal synchronization signal.

According to the present embodiment, mask signal MSex input to the noise canceller 42 rises after the timing one clock before the timing to raise first horizontal synchronization signal HD1 and before the timing to raise first horizontal synchronization signal HD1. It is possible to capture the effective image data at the correct timing without eliminating a noise, if any, that enters during the period to inactivate the mask on condition that the noise has a polarity equal to the active polarity of first horizontal synchronization signal HD1.

Entry of a Noise Having a Polarity (Minus) Opposite to the Polarity of the First Horizontal Synchronization Signal With reference to FIG. 8, the description below explains a case where noise NS having a polarity opposite to the active polarity of first horizontal synchronization signal HD1 enters the FFC 26.

When noise NS as illustrated in FIG. 8 enters the FFC 26, noise NS also enters first horizontal synchronization signal HD1 output from the imaging apparatus 25. The subtractor 48 of the noise canceller 42 is supplied with first horizontal synchronization signal HD1' superimposed with a noise NS component.

When noise NS enters the FFC 26, similar noise NS also enters the image data line 11. The OR circuit 47 is supplied with image data ID0 through ID9 superimposed with the noise NS component. The OR circuit 47 outputs image data ID0 through 1D9 superimposed with noise NS as noise signal NS' illustrated in FIG. 8 that is then input to the buffer 49.

The buffer 49 permits a minus-polarity signal to pass. When minus-polarity noise NS enters, the buffer 49 outputs noise-canceling signal RS containing the component of minus noise NS. The subtractor 48 subtracts noise-canceling signal RS from first horizontal synchronization signal HD1' superimposed with noise NS. The subtractor 48 outputs second horizontal synchronization signal HD2, comparable to a value resulting from subtracting noise-canceling signal RS from first horizontal synchronization signal HD1', to the AND circuit 50.

While mask signal MSex maintains the high signal level, the AND circuit 50 inactivates the mask and outputs a value of second horizontal synchronization signal HD2 input to the AND circuit 50. While mask signal MSex maintains the low signal level, the AND circuit 50 masks second horizontal synchronization signal HD2 and outputs a low signal. Therefore, the AND circuit 50 outputs third horizontal synchronization signal HD3 having the waveform as illustrated in FIG. 8.

According to the present embodiment, as illustrated in FIG. 8, third horizontal synchronization signal HD3 output from the AND circuit 50 to the image processor 43 rises earlier than first horizontal synchronization signal HD1 output from imaging apparatus 25 in terms of timing. However, the image processor 43 determines that third horizontal synchronization signal HD3 rises at the first timing when clock signal CLK rises to reach a specified threshold value or more. Therefore, the image processor 43 recognizes third horizontal synchronization signal HD3 as third horizontal synchronization signal HD3' illustrated in FIG. 8.

The image processor 43 generates an image capturing signal and determines the capturing period for effective image data based on third horizontal synchronization signal HD3' illustrated in FIG. 8. The effective image data can be captured at the same timing as the timing to raise first horizontal synchronization signal HD1 generated in the image reader 24. Therefore, it is possible to avoid a misaligned image or a missing image caused by a noise occurring on the horizontal synchronization signal.

When a minus-polarity noise enters during the period to inactivate the mask, the present embodiment can eliminate noise NS by using noise-canceling signal RS extracted from image data line 11. The use of the OR circuit 47 can extract noise NS from a plurality of image data lines 11. It is possible to more reliably eliminate noise NS by suppressing the effect of a delay due to different wiring lengths.

A minus-polarity noise may enter during the period to inactivate the mask including the timing to raise first horizontal synchronization signal HD1. In such a case, the signal level to raise first horizontal synchronization signal HD1 may attenuate to be lower than or equal to a specified threshold value. When minus-polarity noise NS enters first horizontal synchronization signal HD1, the image processor 43 cannot recognize the horizontal synchronization signal at correct timings just by providing the mask using mask signal MSex.

According to the present embodiment, however, noise-canceling signal RS extracted from image data line 11 is used to eliminate the noise NS component from first horizontal synchronization signal HD1 during the period to inactivate the mask. The noise canceller 42 can thereby output third horizontal synchronization signal HD3 devoid of the noise to the image processor 43.

The present embodiment allows the buffer 49 to input noise-canceling signal RS to the subtractor 48 and thereby eliminates noise NS if entered, only when noise NS has a polarity opposite to the active polarity of first horizontal synchronization signal HD1. It is possible to prevent necessary signal components from being eliminated from first horizontal synchronization signal HD1 when noise NS having a polarity equal to the polarity of first horizontal synchronization signal HD1 enters.

The present embodiment has described the case where first horizontal synchronization signal HD1 has the active polarity set to be plus, but is not limited thereto. When first horizontal synchronization signal HD1 has the active polarity set to be minus, for example, the buffer can be configured to allow only a plus-polarity noise to pass making it possible to provide a result comparable to the present embodiment.

The present embodiment assumes elimination of noise NS occurring over the FFC 26 and provides noise canceller 42 for the image processing apparatus body 41, but may be provided for the image reader 24. In this case, noise NS occurring in the image reader 24 can be eliminated from first horizontal synchronization signal HD1. Third horizontal synchronization signal HD3 devoid of noise NS can be output to the image processor 43.

For example, the above-mentioned embodiments are described in detail in order to explain the present invention for simplicity but are not limited to an entity including all the configurations that have been described. For example, the configuration of one of the above-mentioned embodiments can be partially replaced by the configuration of another embodiment. The configuration of one embodiment can be added to the configuration of another embodiment. The configuration of each embodiment can be partially subject to addition, deletion, or replacement of another configuration.

Although embodiments of the present invention have been described and illustrated in detail, the disclosed embodiments are made for purposes of illustration and example only and not limitation. The scope of the present invention should be interpreted by terms of the appended claims.

REFERENCE SIGNS LIST

1 . . . image processing apparatus, 2 . . . image processing apparatus body, 3 . . . image reader, 4 . . . noise canceller, 5 . . . image processor, 6 . . . imaging apparatus, 7 . . . adder, 8 . . . NOT circuit, 9 . . . FFC, 10 . . . horizontal synchronization signal line, 11 . . . image data line, 12 . . . noise detection signal line, 20 . . . image processing apparatus, 21 . . . image processing apparatus body, 22 . . . noise canceller, 23 . . . image processor, 24 . . . image reader, 25 . . . imaging apparatus, 26 . . . FFC, 27 . . . buffer, 28 . . . selector, 29 . . . adder, 30 . . . NOR circuit, 40 . . . image processing apparatus, 41 . . . image processing apparatus body, 42 . . . noise canceller, 43 . . . image processor, 47 . . . OR circuit, 48 . . . subtractor, 49 . . . buffer, 50 . . . AND circuit

What is claimed is:

1. An image processing apparatus comprising:
   an image reader that reads an image, outputs image data, and generates a horizontal synchronization signal;
   a noise canceller that generates a noise-canceling signal to eliminate a noise entering the horizontal synchronization signal and eliminates a noise from the horizontal synchronization signal; and
   an image processor that acquires effective image data out of image data transferred from the image reader correspondingly to a timing when the horizontal synchronization signal changes from a first signal level to a second signal level,
   wherein the noise canceller generates the noise-canceling signal from a noise detection signal.

2. The image processing apparatus according to claim 1,
   wherein the image reader generates the noise detection signal to be maintained constantly; and
   wherein the noise canceller generates the noise-canceling signal from the noise detection signal and eliminates a noise from the horizontal synchronization signal by using the noise-canceling signal.

3. The image processing apparatus according to claim 1,
   wherein the image reader and the noise canceller are connected via a cable.

4. An image forming apparatus comprising the image processing apparatus according to claim 1.

5. An image processing apparatus comprising:
   an image reader that reads an image, outputs image data, and generates a horizontal synchronization signal;
   a noise canceller that generates a noise-canceling signal to eliminate a noise entering the horizontal synchronization signal and eliminates a noise from the horizontal synchronization signal; and
   an image processor that acquires effective image data out of image data transferred from the image reader correspondingly to a timing when the horizontal synchronization signal changes from a first signal level to a second signal level,
   wherein the noise canceller generates the noise-canceling signal from one of a noise detection signal and image data generated in the image reader;
   wherein the image processor generates a mask signal that unmasks the horizontal synchronization signal during a first period including a period allowing the horizontal synchronization signal to maintain a second signal level and masks the horizontal synchronization signal during a second period other than the first period; and
   wherein the noise canceller uses the mask signal to eliminate a noise entering the horizontal synchronization signal during the second period and uses the noise-canceling signal generated from the image data to eliminate a noise entering the horizontal synchronization signal during the first period.

6. The image processing apparatus according to claim 5,
   wherein the noise canceller generates the noise-canceling signal out of a plurality of image data that are transferred from the image reader via a plurality of image data lines and are available outside a capturing period for effective image data.

7. The image processing apparatus according to claim 6,
   wherein, when input to the noise canceller, the mask signal generated in the image processor unmasks the horizontal synchronization signal after one clock before a timing to change the horizontal synchronization signal from a first signal level to a second signal level and before a timing to change the horizontal synchronization signal from a first signal level to a second signal level and starts masking the horizontal synchronization signal after a timing to change the horizontal synchronization signal from the second signal level to the first signal level.

8. The image processing apparatus according to claim 7,
   wherein the noise canceller uses the noise-canceling signal to eliminate a noise entering the horizontal synchronization signal only when detecting a noise having a polarity opposite to a polarity of the second signal level.

9. An image reading apparatus comprising:
   an image reader that reads an image, outputs image data, and generates a horizontal synchronization signal;
   a noise canceller that generates a noise-canceling signal to eliminate a noise entering the horizontal synchronization signal, eliminates a noise from the horizontal synchronization signal, and transmits the horizontal synchronization signal devoid of a noise to an image processor,
   wherein the noise canceller generates the noise-canceling signal from a noise detection signal.

10. The image reading apparatus according to claim 9,
    wherein the image reader generates the noise detection signal to be maintained constantly; and
    wherein the noise canceller generates the noise-canceling signal from the noise detection signal and eliminates a noise from the horizontal synchronization signal by using the noise-canceling signal.

11. An image reading apparatus comprising:
- an image reader that reads an image, outputs image data, and generates a horizontal synchronization signal;
- a noise canceller that generates a noise-canceling signal to eliminate a noise entering the horizontal synchronization signal, eliminates a noise from the horizontal synchronization signal, and transmits the horizontal synchronization signal devoid of a noise to an image processor,
- wherein the noise canceller generates the noise-canceling signal from one of a noise detection signal and image data generated in the image reader;
- wherein the noise canceller is supplied with a mask signal that unmasks the horizontal synchronization signal during a first period including a period allowing the horizontal synchronization signal to maintain a second signal level and masks the horizontal synchronization signal during a second period other than the first period; and
- wherein the noise canceller uses the mask signal to eliminate a noise entering the horizontal synchronization signal during the second period and uses the noise-canceling signal extracted from the image data to eliminate a noise entering the horizontal synchronization signal during the first period.

12. The image reading apparatus according to claim 11, wherein the noise canceller generates the noise-canceling signal out of a plurality of image data that are transferred from the image reader via a plurality of image data lines and are available outside a capturing period for effective image data.

13. The image reading apparatus according to claim 12, wherein the noise canceller is supplied with a mask signal, when input to the noise canceller, that unmasks the horizontal synchronization signal after one clock before a timing to change the horizontal synchronization signal from a first signal level to a second signal level and before a timing to change the horizontal synchronization signal from a first signal level to a second signal level and starts masking the horizontal synchronization signal after a timing to change the horizontal synchronization signal from the second signal level to the first signal level.

14. The image reading apparatus according to claim 13, wherein the noise canceller uses the noise-canceling signal to eliminate a noise entering the horizontal synchronization signal only when detecting a noise having a polarity opposite to a polarity of the second signal level.

* * * * *